Sept. 23, 1947.    G. W. FYLER    2,427,905
RADIO LOCATING EQUIPMENT
Filed Aug. 24, 1943
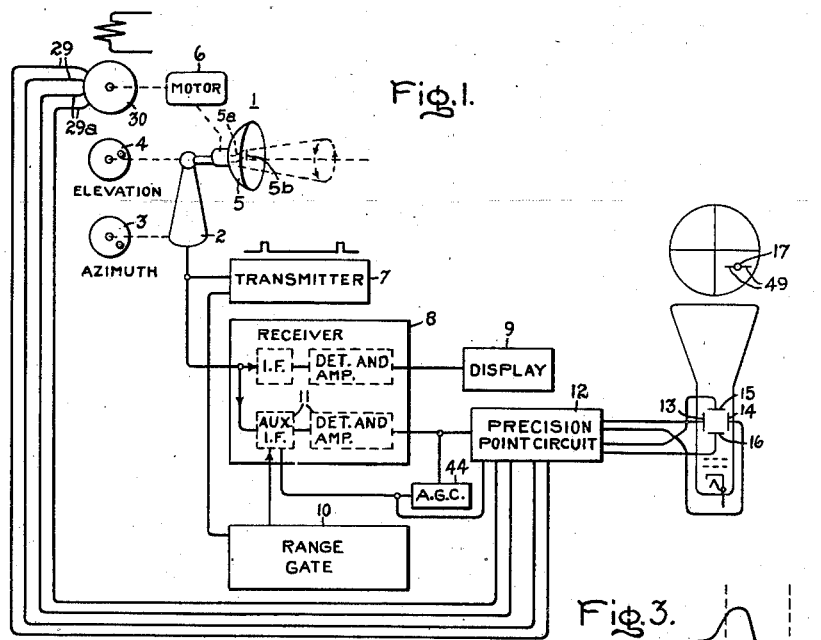
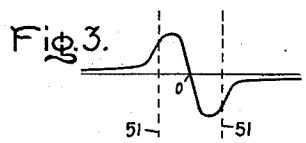
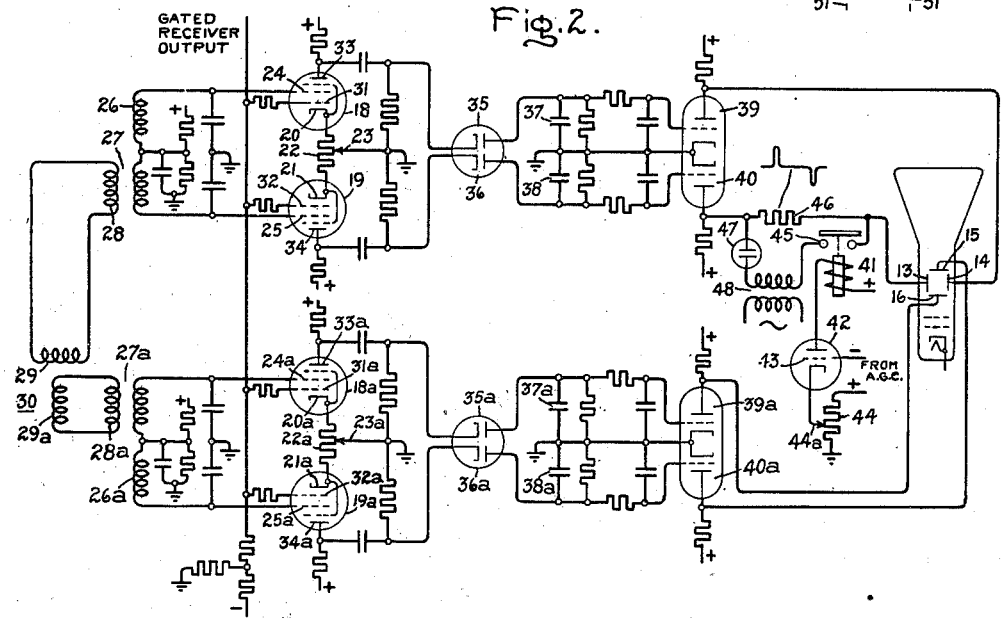
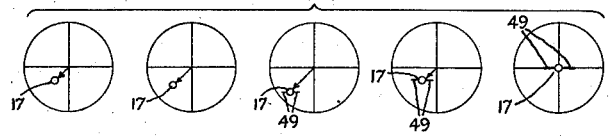
Inventor:
George W. Fyler,
by Harry E. Dunham
His Attorney.

Patented Sept. 23, 1947

2,427,905

UNITED STATES PATENT OFFICE 2,427,905

RADIO LOCATING EQUIPMENT

George W. Fyler, Stratford, Conn., assignor to General Electric Company, a corporation of New York Application August 24, 1943, Serial No. 499,818

10 Claims. (Cl. 250—11)

The present invention relates to radio locating equipment having provisions for representing, for example on the viewing screen of a cathode ray tube, the coordinate position of a target relative to the directive axis of the equipment.

An object of my invention is to provide an improved arrangement for applying a distinguishing mark to the target representation indicating the direction to shift the directive axis of the equipment to more accurately point at the target.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 is a diagram of equipment embodying my invention; Fig. 2 is a detail diagram of the precision point, or echo comparison circuit, represented by a block in Fig. 1; Fig. 3 represents the target marker deflection against displacement between the directive axis of the equipment and the target; and Fig. 4 illustrates the operation of the equipment.

Referring to the drawing, there is shown a directive antenna system 1 carried by a turntable 2 and movable in azimuth and elevation by controls 3 and 4 which respectively cause rotation of the turntable (and antenna) about a vertical axis and pivoting of the antenna relative to the turntable about a horizontal axis. The antenna system comprises a parabolic reflector 5, a wave guide section 5a, and a splash plate 5b all of which are rotated by a motor 6 about the axis of the reflector. The axis of the wave guide section is displaced at a small angle from the axis of rotation of the antenna system so the instantaneous axis of maximum directivity of the antenna system traces or scans a cone of revolution about the antenna system axis which may be termed the mean directive axis of the equipment.

The antenna is connected to a transmitter 7 which supplies pulses of radio waves at the desired repetition rate. During the intervals between the transmitted pulses, reflections or echoes from remote objects are picked up by the antenna and fed through a receiver 8 to suitable display apparatus 9 which may, for example, display the range and direction of all objects within the range of the equipment.

Under some circumstances it is desirable to concentrate on only one of the remote objects. This is accomplished by a range gate 10 adjustably keyed by the transmitter to turn on an auxiliary channel 11 in the receiver 8 only during an interval corresponding to the ranges between which the remote object is located. The output of the auxiliary channel is fed through a precision point circuit 12, shown in detail in Fig. 2, which has the property of comparing the echoes received when the antenna system points to the right and left and to above and below the mean axis of the equipment. The echoes while the antenna system points to the right and left of the axis of the equipment are used to create voltages applied respectively to horizontal deflection plates 13 and 14 of a cathode ray tube causing a horizontal deflection of the beam of the tube in the direction of the stronger echoes, the echoes closest to the directive axis of the antenna system. Similar voltages, obtained from the echoes received when the antenna system points above and below the axis of the equipment, are applied to vertical deflection plates 15 and 16 and cause a vertical deflection of the beam in the direction of the stronger echoes. The combined effect of the echo comparison (precision point) circuit is illustrated in Fig. 1 for the case where the directive axis of the equipment (represented by the center of the viewing screen) is pointed above and to the left of a remote object, represented by the spot 17. By operating the azimuth and elevation controls 3 and 4 to shift the axis of the equipment to the right and down, the equipment can be pointed directly at the object which will then appear at the center of the screen.

The precision point circuit consists of two identical discriminator circuits associated respectively with the horizontal and vertical plates of the cathode ray tube. Only the horizontal circuit will be described and the corresponding parts in the vertical circuit will be indicated by the same reference numerals with the subscript "a."

The horizontal discriminator circuit comprises push-pull connected discharge devices 18 and 19 having cathodes 20 and 21 connected by a resistance 22 having an adjustable tap 23 connected to ground. The tap is adjusted to balance the outputs of the devices 18 and 19. The screen grids 24 and 25 are connected to opposite ends of the secondary 26 of a transformer 27 having a primary 28 energized from one phase 29 of a two-phase generator 30. The generator 30 is driven by the motor 6 in synchronism with the reflector 5 so the generator frequency is identical with the scanning frequency of the antenna system. The other phase 29a of the generator feeds the vertical discriminator. When the antenna system points to the extreme right the voltage on the screen grid 24 is a maximum positive and the voltage on the screen grid 25 is a maximum negative. The screen voltages vary sinusoidally with the scanning position of the antenna system so that the relative voltages applied to the screen grids instantaneously correspond to the relative response of the antenna system to echoes displaced horizontally (vertically in the case of screen grids 24a and 25a) from the mean directive axis. The control grids 31 and 32 are connected to the gated receiver output applying positive pulses coincident with the echoes and having magnitudes varying with the instantaneous directional response characteristics of the antenna system. The combined effect of the control and screen grid voltages causes negative voltages to appear at the anodes 33 and 34 which are respectively fed through diodes 35 and 36 and charge condensers 37 and 38. The condenser voltages after amplification in devices 39 and 40 are applied to plates 13 and 14 producing a horizontal deflection of the beam of the cathode ray tube toward the side from which the stronger echoes are received. Similarly derived voltages are applied to the vertical deflecting plates 15 and 16 causing a corresponding vertical deflection of the beam.

In Fig. 3 the beam deflection (the target marker deflection) is plotted against the angle between the target and the mean directive axis of the antenna system. The beam is centered between one set of the deflecting plates either when the mean directive axis of the antenna system is in a plane bisecting the object or when the mean directive axis is in a plane at a large acute angle to the first plane. When the plane of the directive axis of the antenna system bisects the object, the echo strength is a maximum and is equal for corresponding scanning positions on opposite sides of the plane. There accordingly is no net deflecting voltage and the beam is equidistant from the deflecting plates. As the antenna system is directed away from the object, the deflecting voltage increases to a maximum and then decreases as the angle is increased.

There accordingly is an ambiguity in the representation of the target on the viewing screen and the operator cannot tell (without some experimentation) which way to move the azimuth and elevation controls to point more accurately at the target. Also there is nothing to show whether there is zero signal or a correctly centered signal.

These ambiguities are removed in the present system by a normally closed relay 41 in series with a discharge device 42 having a grid 43 connected to an automatic gain control 44. In the automatic gain control, which corresponds to automatic volume control in broadcast receivers, the gated signals are fed through a peak detector to obtain a negative bias voltage proportional to the signal strength. This A. G. C. bias voltage is applied to the I. F. amplifier reducing the gain for strong signals and thereby tending to maintain a constant average receiver output.

When the A. G. C. voltage reaches a value determined by the adjustment of a tap 44a, the device 42 cuts off, interrupting the current through relay 41 and permitting closing of the relay contacts 45. The contacts 45 are in series with a resistance 46 and a neon tube 47 which breaks down at the positive and negative peaks of an A. C. voltage applied through a transformer 48. Current flows through the resistance 46 at the peaks causing alternate positive and negative voltages of short duration which cause corresponding horizontal deflection of the beam producing traces 49, as shown in Fig. 1, which resemble wings. Because the wings are traced only during the peaks, the wings are of less brilliance than the spot marking the position of the target. The appearance of wings on the target informs the operator that the equipment is not only on a target but is pointed close enough to the target so that the target marker corresponds to the central range of deflection characteristic (between dotted lines, Fig. 3) and that the azimuth and elevation controls should be manipulated to cause movement of the directive axis of the antenna system toward the target marker. This should be done even through the target marker apparently moves away from the center of the viewing screen, as might be the case if the A. G. C. voltage caused operation of the relay at target positions less than the maximum deflection.

The operation of the equipment is illustrated in Fig. 4 which shows from left to right successive images of the cathode ray viewing screen as the operator manipulates the azimuth and elevation control to point at a target. At the extreme left in Fig. 4 the target is represented by a spot down and to the left of the center of the viewing screen. Because the wings 49 are not present, the operator knows that the target is a considerable distance off line of the mean directive axis of the equipment represented by the intersecting cross hairs at the center of the screen. As the azimuth and elevation controls are manipulated to shift the directive axis of the equipment toward the target, the target first appears to move away from the center of the viewing screen, which would seem to indicate that the equipment was moving away from rather than toward the target. Actually (as is apparent from Fig. 3) the greater displacement of the target from the center of the screen indicates that the directive axis of the equipment is approaching the target, or, in other words, that the accuracy of pointing is increasing. As the operator continues the movement of the equipment, the target moves to the outer part of the screen, and at this time wings 49 appear on the target which indicate to the operator that the angle between the target and the directive axis of the equipment lies between the dotted lines 51 in Fig. 3. By continuing the movement of the directive axis of the equipment in the same direction the target marker, which now carries the identifying wings 49, can be brought to the center of the viewing screen, as indicated at the extreme right in Fig. 4, indicating that the equipment is pointed directly at the target.

When the target marker does not have any identifying wings, the operator knows that the equipment is moving toward the target even though the target marker appears to be moving away from the center of the viewing screen. When the identifying wings are present the operator knows that the equipment is moving toward the target when the target marker appears to move toward the center of the viewing screen. The identifying wings accordingly remove an ambiguity in the target representation which would otherwise interfere with the use of the equipment.

It will be evident to those skilled in the art that my invention is equally effective whether the received wave energy is transmitted from the locating apparatus to the target and reflected by the target, or the source of the received waves is a separate transmitter located at the target. Wave energy emitted from the remote object, either by reason of reflection, by reason of the operation of apparatus on such object in response to waves transmitted from the locating equipment, or by reason of direct transmission from the remote object affects the receiver in like manner.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States, is:

1. In a radio locating equipment, a directional receiver for wave energy emitted from a target, means periodically varying the orientation of the directive axis of the receiver about a mean position, wave comparison means for indicating deviation of the mean directive axis of the receiver from the target, said wave comparison means having a maximum indication at a predetermined deviation and a lesser indication for greater or less deviation within the range of the receiver, and means responsive to received wave strength greater than a predetermined minimum for indicating the direction of the deviation from said predetermined deviation.

2. In radio locating equipment, a receiver having provisions for directionally receiving wave energy from a target along paths spaced around a median axis, a cathode ray tube, coordinate deflecting means for the beam of the cathode ray tube, wave comparison means associated with the respective deflecting means for causing a deflection of the beam in accordance with the relative coordinate components of the waves whereby the position of the beam represents the relative position of the target and the median axis of the equipment, gain control means for the receiver, and means responsive to the gain control for producing an indication of the pointing of said median axis toward the target.

3. In radio locating equipment, a receiver having provisions for directionally receiving wave energy from a target along paths spaced around a median axis, a cathode ray tube, horizontal and vertical deflecting means, means responsive to the horizontal and vertical components of the waves for deflecting the beam to a position representing the accuracy of pointing of the directive axis of the equipment toward the target, and means responsive to orientation of said axis with greater than a predetermined accuracy of pointing for applying an alternating voltage to said horizontal deflecting means causing deflection of the beam simulating wings.

4. In radio locating equipment, a viewing screen representing the field of vision of the equipment, means for comparing the wave energy received from a target along paths spaced around the directive axis of the equipment and producing on the screen a spot deflected toward the stronger waves to represent the position of the target in said field of vision, and means responsive to orientation of said axis with greater than a predetermined accuracy of pointing of the equipment toward the target for applying wings to the spot.

5. In radio locating equipment, means for receiving wave energy from a target a viewing screen representing the field of vision of the equipment, wave comparison means for producing on the screen a spot representing the position of the target in said field of vision, and automatic gain control means for applying a distinguishing indication to the spot representing the accuracy of pointing.

6. In combination, directional means for receiving wave energy from a remote object, means for periodically varying the orientation of said receiving means about a mean directive axis, means for indicating the deviation of said axis from said remote object, said indicating means having a maximum indication for a predetermined angle of deviation between said axis and the path of said received wave and a lesser indication for larger or smaller angles of deviation, and means responsive to the intensity of said received waves for distinguishing said larger from said smaller angles.

7. In combination, directional means for receiving wave energy from a remote object, means for periodically varying the orientation of said receiving means about a mean directive axis, means for indicating the deviation of said axis from said remote object, and means for modifying the indication produced by said third means in response to the reception of waves exceeding a predetermined minimum intensity.

8. In combination, a directional means for receiving wave energy from a remote object, means for periodically varying the orientation of said receiving means about a mean directive axis, non-linear means for indicating the deviation of said axis from said remote object, and means responsive to the intensity of said received waves for indicating the presence of said object within a predetermined central range of deviation.

9. In a radio echo apparatus, directional means for receiving echo pulses emitted from a remote object, means for periodically varying the orientation of said receiving means about a mean directive axis, means for projecting an electron beam upon a sensitive screen to produce a visible spot, means responsive to said pulses for deflecting said beam in accordance with the angle of deviation between said directive axis and the path of said pulses, said deflection being a maximum at a predetermined angle of deviation greater than zero and decreasing for greater angles of deviation, and means responsive to echo pulses exceeding a predetermined minimum intensity for controlling said beam to apply a distinguishing indication to said spot.

10. In a radio echo apparatus, directional means for receiving recurrent echo pulses emitted from a remote object, means for periodically varying the orientation of said receiving means about a mean directive axis, means for projecting an electron beam against a sensitive screen to produce a visible spot, means synchronized with said orientation varying means and with said received pulses for deflecting said beam in accordance with the angle of deviation between said directive axis and the path of said pulses, said deflection being substantially linear within a predetermined central range of deviation and non-linear beyond said range, and means responsive to echo pulses exceeding a predetermined minimum intensity for oscillating said beam locally about said spot to provide a significant indication whenever said remote object lies within said central range of deviation.

GEORGE W. FYLER.

REFERENCES CITED

The following references are of record in the file of this patent:

UNITED STATES PATENTS

| Number | Name | Date |
|---|---|---|
| 2,216,708 | Kolster | Oct. 1, 1940 |
| 2,151,549 | Becker | Mar. 21, 1939 |